US006970804B2

United States Patent
Siegel et al.

(10) Patent No.: US 6,970,804 B2
(45) Date of Patent: Nov. 29, 2005

(54) AUTOMATED SELF-LEARNING DIAGNOSTIC SYSTEM

(75) Inventors: Robert P. Siegel, Penfield, NY (US); Feng Zhao, Campbell, CA (US)

(73) Assignee: Xerox Corporation, Stamford, CT (US)

( * ) Notice: Subject to any disclaimer, the term of this patent is extended or adjusted under 35 U.S.C. 154(b) by 101 days.

(21) Appl. No.: 10/320,908

(22) Filed: Dec. 17, 2002

(65) Prior Publication Data

US 2004/0117153 A1 Jun. 17, 2004

(51) Int. Cl.[7] .............................................. G21C 17/00
(52) U.S. Cl. ........................ 702/182; 702/183; 702/34; 714/25; 371/15.1
(58) Field of Search ............................ 702/57–59, 108, 702/113, 115, 117, 183; 358/1.15; 340/3.43, 340/3.1; 399/8; 709/223; 371/15.1

(56) References Cited

U.S. PATENT DOCUMENTS

| 5,057,866 | A | * | 10/1991 | Hill et al. ...................... 399/8 |
| 5,123,017 | A | | 6/1992 | Simpkins et al. ........... 371/15.1 |
| 5,414,494 | A | * | 5/1995 | Aikens et al. .................. 399/1 |
| 5,566,092 | A | | 10/1996 | Wang et al. ............ 364/551.02 |
| 5,873,009 | A | * | 2/1999 | Yamashita et al. ............. 399/8 |
| 5,953,226 | A | | 9/1999 | Mellish et al. ............... 364/147 |
| 6,041,287 | A | | 3/2000 | Dister et al. ................. 702/182 |
| 6,199,018 | B1 | | 3/2001 | Quist et al. ................... 702/34 |
| 6,687,653 | B1 | * | 2/2004 | Kurien et al. ............... 702/183 |
| 6,782,345 | B1 | * | 8/2004 | Siegel et al. ................. 702/183 |

* cited by examiner

*Primary Examiner*—Kamini Shah
(74) *Attorney, Agent, or Firm*—Linda M. Robb

(57) ABSTRACT

A self-learning diagnostic system provides diagnostics capabilities which may be applied to a population of networked machines or components and assemblies in a product. The self-learning diagnostic system uses both the components' own historical data and the data for an entire population of networked machines of a given product in the field as the training set to adjust critical threshold parameters for detection and diagnosis. The system includes a nominal diagnostic threshold setting module which sets initial thresholds and an adjustment module, which adjusts thresholds continuously based on machine performance data. A service records evaluation module checks service records periodically for correlations and an adjustment module adjust service strategies based on correlation data.

20 Claims, 2 Drawing Sheets

AUTOMATED SELF-LEARNING DIAGNOSTIC SYSTEM

INCORPORATION BY REFERENCE

The following U.S. patents are fully incorporated herein by reference: U.S. Pat. No. 5,123,017 TO Simpkins et al. ("Remote Maintenance Monitoring System"); U.S. Pat. No. 5,566,092 to Wang et al. ("Machine Fault Diagnostics System and Method"); U.S. Pat. No. 5,953,226 to Mellish et al. ("Control System Having an Application Function with Integrated Self Diagnostics"); U.S. Pat. No. 6,041,287 to Dister et al. ("System Architecture for On-Line Machine Diagnostics"); and U.S. Pat. No. 6,199,018 to Quist et al. ("Distributed Diagnostic System").

BACKGROUND OF THE INVENTION

This invention relates generally to machine and process control systems and more particularly to an automated self-learning diagnostic system for use with networked machines.

Diagnostics are utilized in machine control and process control systems to identify the cause of failure in a machine component or system from a failure symptom, as well as to predict the occurrence of a particular failure type from precursors. In a rapidly moving, competitive marketplace, the drive to develop and introduce new products as expeditiously as possible introduces difficulties in providing machine diagnostic capabilities, particularly for populations of networked machines. Diagnostics require an extended development cycle, since the determination of which components will fail in actual practice cannot be made until production level machines are available for testing purposes.

Current practices in developing diagnostic algorithms require extensive life-testing of components in order to determine nominal and threshold values for many critical parameters of the algorithms. The data collection can be tedious, error prone and sometime delay the timely introduction of new products. Worse, because of variability in manufacturing processes and machine operations in the field, newly launched products typically require continuous adjustment of alert levels in order to minimize unnecessary or missed alarms. For example, a fuser roll in a copy machine is generally replaced at a preset interval, which is initially determined by laboratory testing. Field experience has been known to show service intervals that vary significantly from the initial values.

In developing machine diagnostics, it would be useful to have an approach which utilizes machine data provided across a large number of machines connected on a digital information network such that the actual signals can be remotely observed.

The following U.S. Patents may be useful in providing additional background information on the use of diagnostic systems:

U.S. Pat. No. 5,123,017 to Simpkins et al. for "Remote Maintenance Monitoring System" teaches a remote maintenance monitoring system structured to capture failure data from a hardware device. The collected failure data is analyzed with an expert system to isolate the origin of the failure to facilitate maintenance of a monitored large-scale system.

U.S. Pat. No. 5,566,092 to Wang et al. for "Machine Fault Diagnostics System and Method" discloses a machine fault diagnostic system which employs a diagnostic network based on a neural network architecture. A hypothesis and test procedure based on fuzzy logic and physical bearing models operates to detect faults and analyze complex machine conditions.

U.S. Pat. No. 5,953,226 to Mellish et al. for "Control System Having an Application Function with Integrated Self Diagnostics" teaches a self-diagnostic system integrated into an application program for controlling a machine or process. The diagnostic program annunciates an event when the application program cannot execute a desired response by monitoring certain preselected and marked segments of the application program and the program allocates memory to save the result. When an abnormal occurrence in the segments results in the desired event not occurring, the diagnostic system determines what part of the logic expression controlling the event could not be completed. This information is saved and used for annunciating the reason for the desired event not happening.

U.S. Pat. No. 6,041,287 to Dister et al. for "System Architecture for On-Line Machine Diagnostics" discloses a machine diagnostic system which includes a host computer for determining a health state of a machine. A machine diagnostic module is adapted to be integrally mounted to a machine, with the machine diagnostic module operatively coupled to a network. The machine diagnostic module collects data relating to operation of the machine and preprocesses the data, with the host computer analyzing the preprocessed data to determine the health state of the machine.

U.S. Pat. No. 6,199,018 to Quist et al. for "Distributed Diagnostic System" teaches a system in which a plurality of local monitoring devices collect local information concerning various machines and process that information for diagnostic purposes. The local information collected is provided to a global processor that globally process the collected information to provide updated diagnostic parameters to the local monitoring devices.

SUMMARY OF THE INVENTION

Briefly stated, and in accordance with one aspect of the present invention, disclosed herein is a self-learning diagnostic system providing diagnostics capabilities which may be applied to a population of networked machines or components and assemblies in a product. The self-learning diagnostic system uses both the components own historical data and the data for an entire population of networked machines of a given product in the field as the training set to adjust critical threshold parameters for detection and diagnosis. The system includes a nominal diagnostic threshold setting module which sets initial thresholds and an adjustment module, which adjusts thresholds continuously based on machine performance data. A service records evaluation module checks service records periodically for correlations and an adjustment module adjust service strategies based on correlation data.

In accordance with another aspect of the invention, a method for operating a self-learning diagnostic system for a population of networked machines includes receiving initial machine data and determining a nominal set of diagnostic set points and thresholds. Machine performance data is collected from field machines and set points and thresholds are updated. The system checks machine service records for undetected failures, updates or adds machine service rules, and adjusts diagnostic thresholds. This process is repeated continuously during operation of the population of networked machines. Feedback is provided to engineering divisions and design teams.

In another aspect of the invention, there is provided a method for operating a self-learning diagnostic system for a population of networked machines in which initial machine data is received and a nominal set of diagnostic set points and thresholds is established. Machine performance data is then collected from field machines and the set points and thresholds are updated. Feedback is then provided to engineering divisions and/or design teams.

In yet another aspect of the invention, a method for operating a self-learning diagnostic system for a population of networked machines includes receiving machine service records and checking them for undetected failures. Machine service rules are then updated or new service rules are added. Diagnostic thresholds are adjusted and feedback is provided to engineering divisions and/or design teams.

In another aspect of the invention, there is provided a self-learning diagnostic system for a population of networked machines having a nominal diagnostic threshold setting module and a threshold adjustment module.

In yet another aspect of the invention, a self-learning diagnostic system for a population of networked machines includes a service records evaluation module and a module for adjusting diagnostic thresholds.

In a final aspect of the invention, there is provided an article of manufacture in the form of a computer usable medium having computer readable program code embodied in the medium which, when the program code is executed by the computer causes the computer to perform method steps for operating a self-learning diagnostic system for a population of networked machines. The method includes receiving initial machine data and determining a nominal set of diagnostic set points and thresholds. Machine performance data is collected from field machines and set points and thresholds are updated. Machine service records are checked for undetected failures and machine service rules are updated or added. Diagnostic thresholds are then adjusted. Collecting machine performance data from field machines, updating set points and thresholds, checking machine service records for undetected failures, updating or adding machine service rules and adjusting diagnostic thresholds are repeated continuously during operation of the networked system. Feedback is provided to engineering divisions or design teams.

BRIEF DESCRIPTION OF THE DRAWINGS

The foregoing and other features of the instant invention will be apparent and easily understood from a further reading of the specification, claims and by reference to the accompanying drawings in which:

DETAILED DESCRIPTION OF THE INVENTION

The system disclosed herein is a self-learning diagnostic approach, which can be applied to any number of critical components and assemblies in a product. Typical novelty-based detection and diagnosis algorithms generate a diagnostic alert when a device's behavior deviates from a nominal level by an amount that exceeds a predetermined threshold. The self-learning diagnostic system and method uses both the components own historical data and the data for an entire population of networked machines of a given product in the field as the training set to adjust critical threshold parameters in the detection and diagnostics algorithms.

This is attractive for a number of reasons:
1. The continuously adjusted thresholds can adapt to product and operational variability due to factors such as manufacturing processes, environmental conditions (such as geographic location), usage rate, service history, and component stress and aging, among others;
2. The size of the population on which to "train" the diagnostic algorithm can be controlled to meet service requirements; and
3. Adjustment of thresholds allows products to be highly "customizable" for different use environments or geographic regions, for example, a machine considered as "noisy" in an office environment may be acceptable in a printshop.

Figure 1:
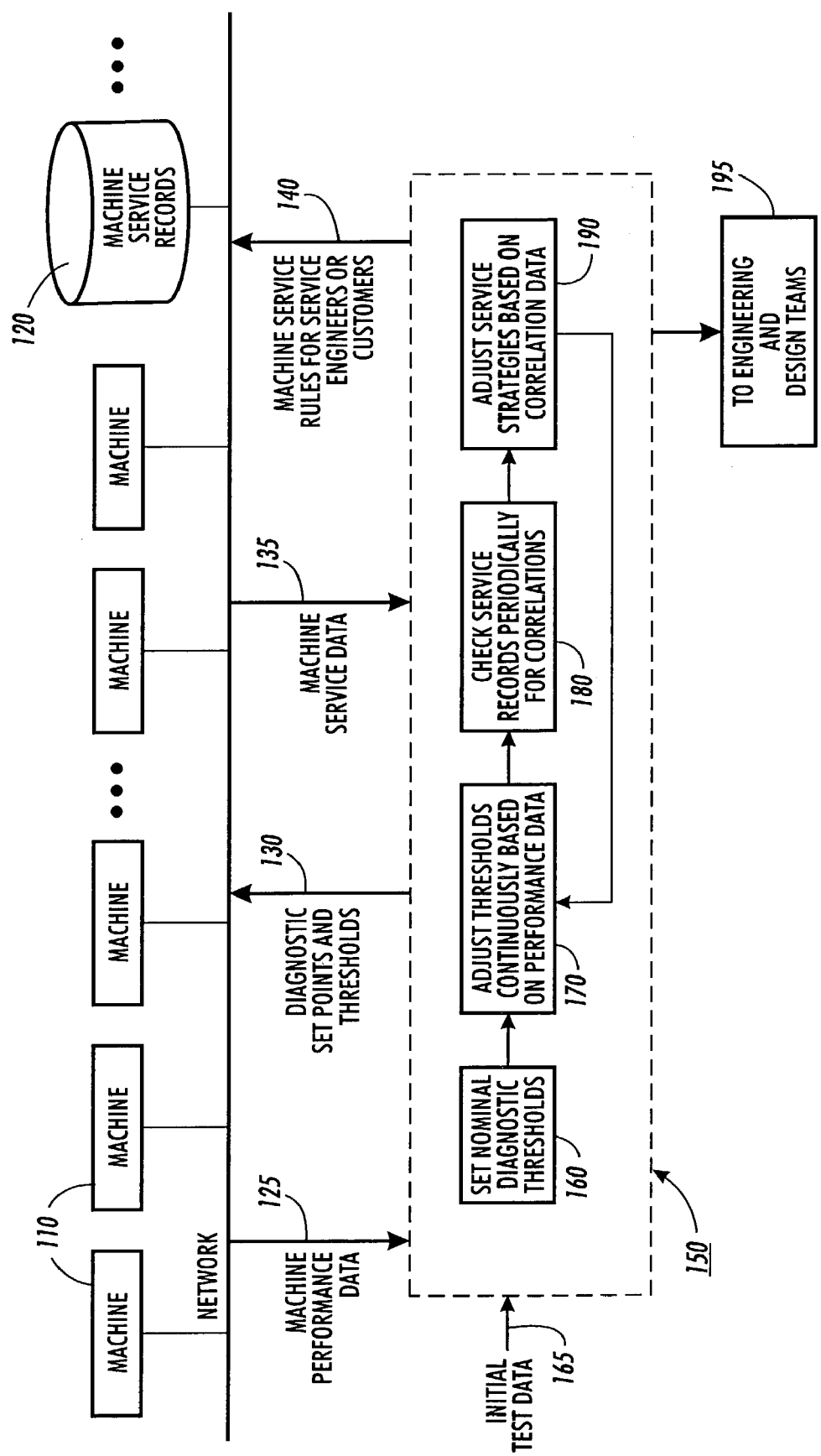
FIG. 1 is a system and use diagram of a distributed on-line machine diagnostic system according to the subject invention.

Referring now to FIG. 1, a fully-configured self-learning diagnostic system 150 taught herein utilizes detection and diagnostic algorithms that use a training set of initial test data 165 to develop a statistical model of a known good device. In operation, a large data of actuations are recorded for numerous known good devices and from this data a composite model of a good device is extracted and the nominal diagnostic threshold module 160 sets initial thresholds. Examples of such models include Fourier spectral coefficients, wavelet transformations described as time-frequency distributions, or principal components of high-dimensional data sites. The composite model is then used as a baseline against which the performance of the device in the field is measured. Threshold adjustment module 170 continuously adjusts thresholds based on performance data 125 received from networked machines 110.

The continuously adjusted thresholds can adapt to product and operational variability due to factors such as manufacturing processes, environmental conditions (e.g., geographic location), usage rate, service history, and component stress and aging. This provides a monitoring system for an entire population of networked machines which can be used to understand the big picture, discover performance trends and regional variations, fine-tune diagnostic thresholds and drive corrective action. The system employs data mining and other analysis techniques to quickly identify global problems based on input from a large number of machines. A certain amount of deviation from the composite model is considered allowable due to the inherent variation to be found in a population of manufactured parts. At a certain level of deviation known as a threshold level, the deviation is considered non-ordinary and is taken to be diagnostic of a fault condition.

Diagnostic set points and thresholds 130 are communicated by self-learning diagnostic system 150 to the networked machines 110, which are also providing machine service data 135 back to diagnostic system 150 from machine service records 120. Service records evaluation module 180 checks service records periodically for correlations, and service strategies are adjusted based on the correlation data by adjustment module 190. For the purposes herein, correlation refers to the co-occurrence of faults with actions in service or replacement records. For example, if a diagnostic module finds that a copier fuser is faulty and the corresponding service record shows that the fuser was subsequently replaced, then there is a correspondence. On the other hand, if the diagnostic module thinks there is a fault, but service records show no action being taken, then either the diagnostic module needs to be adjusted (to reduce false alarms), or the service rules need to be updated to require appropriate service actions. Machine service rules 140 are provided to networked machines 110. The process of adjusting thresholds at adjustment module 170, checking service records periodically at module 180 and adjusting service strategies based on correlation data at module 190 is repeated to continually update diagnostic thresholds and service strategies. This information may also be passed to engineering and design teams 195 so that necessary changes may be made to the design and manufacturing procedures. This type of diagnostic algorithm can be extended to be life predictive by generating a training set containing samples at various intervals during the component's life cycle. Correlation can then be made between a test sample and the reference set of time indexed training samples. The test sample is then associated with the age of the training samples having the highest correlation.

As one knowledgeable in the art will appreciate, the self-learning diagnostic system 150 taught herein may have alternate module configurations. For example, the self-learning diagnostic system 150 may be configured to include data acquisition module 160 and threshold adjustment module 170 only. Initial machine performance data 165 and machine performance data 125 would still be received, and diagnostic set points and thresholds 130 will be output to engineering and design teams 195 and to the machine network. Alternatively, the self-learning diagnostic system 150 may be configured to include service records evaluation module 180 and adjustment module 190 only. Machine service data 135 would still be received, and machine service rules for service engineers or customers 140 will be output to engineering and design teams 195 and to the machine network.

The self-learning method leverages network connectivity to amalgamate the data from many machines in the field over time. This amalgamation of samples can provide a statistically large sample space upon which a robust training set can be built. Training sets for nominal performance diagnostics can be developed or life predictive diagnostics may be developed. In the case of new products, this allows diagnostic algorithms to accumulate machine operation data over time and continuously adjust detection thresholds as components age. The advantage of this network-based diagnosis lies in exploiting machine data and service records of an entire population over time to form a basis for diagnostic decisions.

In novelty-based detection the self-learning process uses the growing body of operation data of a machine to establish the nominal set point and deviation threshold. The set point and threshold are updated as new data comes and service records for the machine are examined. To increase robustness and reject statistical anomalies, data from other devices of the same type in the field are collected and serve as an additional input to set the threshold. A more sophisticated use of the population data partitions the data according to statistically significant distinctions and correlates with service records to automatically establish new detection parameters or new fault types. This mode of unsupervised learning may be preferred for new products for which relatively little is known about modes of degradation and failure. For example, as a new product is field tested, the algorithm might discover that the inverter assembly in a copier or printer begins to exhibit a higher-degree of wear than the design has predicted, based on the service records, field sensor data, and environmental conditions. The discovery can then be used to adjust the operation of the machine (e.g., adjust machine timing to decrease wear on the assembly), change the detection threshold for the monitor, and provide an input to the engineering team to redesign the assembly or change manufacturing parameters.

The approach also applies to life predictive diagnosis of components. Population data establishes nominal evolutionary trajectories for components and reduces the probability of including outliers and disturbance in the training data. For the purposes herein, an outlier is defined as a data point that lies outside the nominal range. For example, a data point more than 3 Sigma away from the center of a Gaussian data distribution may be considered as an outlier. This results in continuously improving diagnostic performance. It also allows for an early product launch based on some nominal set of threshold values.

Figure 2:
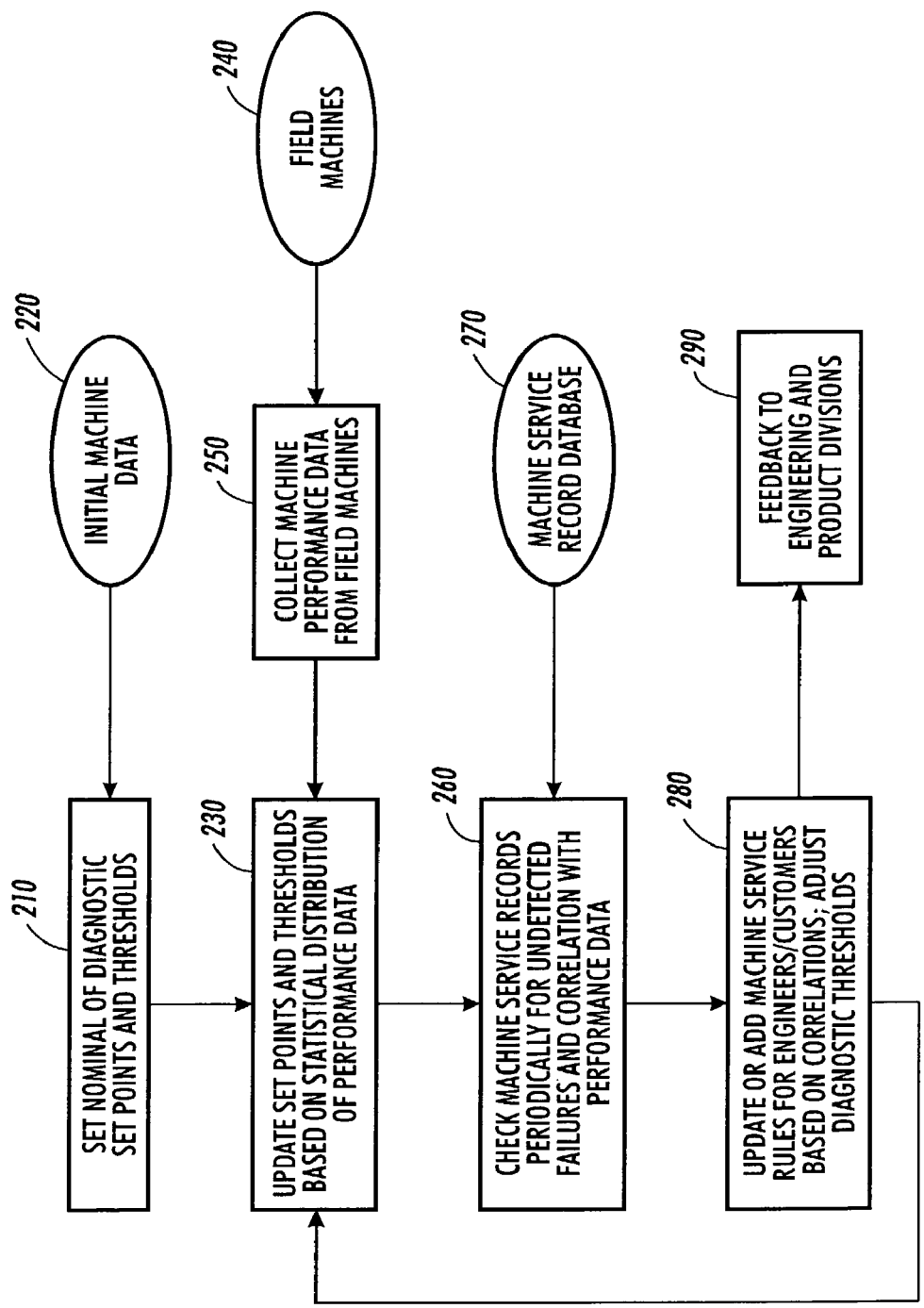
FIG. 2 is a flowchart showing the required steps for operation of the self-diagnosing system according to the subject invention.

FIG. 2 illustrates a flow chart for the operation of the system. A product is launched with an initial set of diagnostics thresholds 210 based on "best guess" experience and initial machine data 220. At 250 performance data is collected from all machines 240 in the field through a remote network interface. The field data collected is treated as training data in a learning algorithm and set points and thresholds are updated based on statistical distribution of performance data at 230. Standard filtration and outlier rejection techniques are used to clean up the training set and remove spurious noise. A data mining check 260 of the process integrity is made in which field service records 270 are checked to make sure machine failures are not going undetected. Adjustments are made to the learning algorithm to improve its performance at 280. Data is continuously collected and used through the product's life cycle, although the rate of change will decrease with time as steady state is reached. Initial "performance" diagnostics give way to life prediction, as sufficient data becomes available. Feedback is provided to engineering and product divisions at 290. The system operation described herein may be performed in a centralized location, for example in a service provider's or manufacturer's office, or it may be distributed throughout machine clusters, or may even be embedded in each field machine. Similarly, diagnostic adjustment may be performed offline, using data collected from field machines, or online using real-time machine performance data over the network connection.

As one knowledgeable in the art will appreciate, the operation of the self-learning diagnostic system will vary depending on the features with which the system is configured. For example, the operation of the system may include receiving initial machine data 220, determining a nominal set of diagnostic set points and thresholds 210, collecting machine performance data from field machines 250, and updating set points and thresholds 230. These updated thresholds and set points are then provided to engineering and product divisions 290 and to the system network. Alternatively, the operation of the self-learning diagnostic system may include checking machine service records for undetected failures 260 after checking machine service records 270 and adjusting diagnostic thresholds 280. The new diagnostic thresholds and updated machine service rules are then provided to the engineering and product divisions 290 and to the machine network.

While the present invention has been illustrated and described with reference to specific embodiments, further modification and improvements will occur to those skilled in the art. Additionally, "code" as used herein, or "program" as used herein, is any plurality of binary values or any executable, interpreted or compiled code which can be used by a computer or execution device to perform a task. This code or program can be written in any one of several known computer languages. A "computer", as used herein, can mean any device which stores, processes, routes, manipulates, or performs like operation on data. It is to be understood, therefore, that this invention is not limited to the particular forms illustrated and that it is intended in the appended claims to embrace all alternatives, modifications, and variations which do not depart from the spirit and scope of this invention.

What is claimed:

1. A self-learning diagnostic system for a population of networked machines, comprising:
    a nominal diagnostic threshold setting module for initiating self-learning, wherein initiating self-learning includes setting initial machine component thresholds based on a composite model of the machines within the population of networked machines;
    a threshold adjustment module for continuously analyzing real time machine performance data received from each of the networked machines to identify performance trends among the networked machines, wherein said performance trends are utilized to develop new machine component thresholds;
    a service records evaluation module; and
    an adjustment module.

2. The self-learning diagnostic system according to claim 1, wherein said threshold adjustment module continuously adjusts said initial machine component thresholds.

3. The self-learning diagnostic system according to claim 1, wherein said service records evaluation module checks service records pedodically for data correlations, wherein said data correlations comprise the co-occurrence of faults with actions recorded in said service records.

4. The self-learning diagnostic system according to claim 1, wherein said adjustment module adjusts service strategies based on correlation data.

5. The self-learning diagnostic system according to claim 1, wherein the self-learning diagnostic system provides machine service rules for service engineers or customers.

6. The self-learning diagnostic system according to claim 1, wherein said adjustment module continuously adjusts detection thresholds as components within the population of networked machines age.

7. The self-learning diagnostic system according to claim 1, wherein said adjustment module continuously adjusts detection thresholds as environmental conditions change.

8. A method for operating a self-learning diagnostic system for a population of networked machines, comprising:
    receiving initial machine data;
    determining a nominal set of diagnostic set points and thresholds, wherein said nominal set of thresholds is based on a composite model of the machines within the population of networked machines;
    perfonning self-learning diagnostics comprising:
        collecting machine performance data from the population of networked machines;
        analyzing real time performance data from the networked machines to identity performance trends;
        utilizing said performance trends to develop new machine component thresholds;
        updating set points with said new machine component;
        checking machine service records for undetected failures;
        updating or adding machine service rules; and
        adjusting diagnostic thresholds;
        repeating performance of self-learning diagnostics continuously during operation of the population of networked machines; and
        providing feedback to engineering divisions.

9. The method for operating a self-learning diagnostic system for a population of networked machines according to claim 8, wherein updating set points and thresholds is based on statistical distribution of performance data.

10. The method for operating a self-learning diagnostic system for a population of networked machines according to claim 8, wherein checking machine service records further comprises checking machine service records for correlation with performance data, wherein said data correlations comprise the co-occurrence of faults with actions recorded in said service records.

11. The method for operating a self-learning diagnostic system for a population of networked machines according to claim 8, wherein updating or adding machine service rules is based on the correlation of machine service records with performance data.

12. The method for operating a self-learning diagnostic system for a population of networked machines according to claim 8, wherein providing feedback further comprises providing feedback to product divisions.

13. The method for operating a self-learning diagnostic system for a population of networked machines according to claim 8, further comprising performing said method in a centralized location.

14. The method for operating a self-learning diagnostic system for a population of networked machines according to claim 8, further comprising performing said method with distributed machine clusters.

15. The method for operating a self-learning diagnostic system for a population of networked machines according to claim 8, further comprising embedding said method in each machine of the population of networked machines.

16. The method for operating a self-learning diagnostic system for a population of networked machines according to claim 8, further comprising performing said method off-line.

17. The method for operating a self-learning diagnostic system for a population of networked machines according to claim 8, further comprising performing said method on-line using real-time machine performance data over a network connection.

18. The self-learning diagnostic system according to claim 1, wherein said adjustment module continuously adjusts detection thresholds as usage patterns vary.

19. A method for operating a self-learning diagnostic system for a population of networked machines, comprising:
    receiving initial machine data;
    determining a nominal set of diagnostic set points and thresholds, wherein said nominal set of thresholds is based on a composite model of the machines within the population of networked machines;
    collecting machine performance data from field machines;
    analyzing real time performance data from the networked machines to identify performance trends;
    utilizing said performance trends to develop new machine component thresholds;
    updating said nominal set points and thresholds based on said new machine component thresholds; and
    providing feedback to engineering divisions.

20. An article of manufacture comprising a computer usable medium having computer readable program code embodied in said medium which, when said program code is executed by said computer causes said computer to perform method steps for operating a self-learning diagnostic system for a population of networked machines, said method comprising:

receiving initial machine data;

determining a nominal set of diagnostic set points and thresholds, wherein said nominal set of thresholds is based on a composite model of the machines within the population of networked machines;

performing self-learning diagnostics comprising:

collecting machine performance data from the population of networked machines;

analyzing real time performance data from the networked machines to identity performance trends;

utilizing said performance trends to develop new machine component thresholds;

updating set points with said new machine component thresholds;

checking machine service records for undetected failures;

updating or adding machine service rules; and adjusting diagnostic thresholds;

repeating performance of self-learning diagnostics continuously during operation of the population of networked machines; and providing feedback to engineering divisions.

\* \* \* \* \*